(12) United States Patent
Son et al.

(10) Patent No.: US 10,987,714 B2
(45) Date of Patent: Apr. 27, 2021

(54) METHOD FOR FORMING VEHICLE BODY MEMBER

(71) Applicants: HYUNDAI MOTOR COMPANY, Seoul (KR); KIA MOTORS CORPORATION, Seoul (KR); HYUNDAI STEEL COMPANY, Incheon (KR)

(72) Inventors: Kyung Hoon Son, Suwon-si (KR); JiHwan Kim, Ulsan (KR); KyoungSu Jin, Ulsan (KR); BaekGu Kang, Ulsan (KR); JeongReal Kim, Ulsan (KR)

(73) Assignees: HYUNDAI MOTOR COMPANY, Seoul (KR); KIA MOTORS CORPORATION, Seoul (KR); HYUNDAI STEEL COMPANY, Incheon (KR)

( * ) Notice: Subject to any disclaimer, the term of this patent is extended or adjusted under 35 U.S.C. 154(b) by 15 days.

(21) Appl. No.: 16/550,709

(22) Filed: Aug. 26, 2019

(65) Prior Publication Data
US 2020/0376531 A1 Dec. 3, 2020

(30) Foreign Application Priority Data
May 28, 2019 (KR) .......................... 10-2019-0062651

(51) Int. Cl.
*B21D 5/00* (2006.01)
*B21D 51/02* (2006.01)
(Continued)

(52) U.S. Cl.
CPC .......... *B21D 5/008* (2013.01); *B21D 22/025* (2013.01); *B21D 51/02* (2013.01); *B62D 25/04* (2013.01); *B62D 25/06* (2013.01)

(58) Field of Classification Search
CPC ...... B21D 5/008; B21D 51/02; B21D 22/025; B21D 15/02; B21D 47/01; B21D 35/00;
(Continued)

(56) References Cited

U.S. PATENT DOCUMENTS 10,597,090 B2 * 3/2020 Son ...................... B62D 25/06
2007/0144632 A1 * 6/2007 Toyoda et al. .......... C22C 38/32
148/593

(Continued)

FOREIGN PATENT DOCUMENTS

JP 3653871 B2 * 6/2005 ............. B21C 37/08
KR 10-2019-0085271 A 7/2019

*Primary Examiner* — Bayan Salone
(74) *Attorney, Agent, or Firm* — Morgan, Lewis & Bockius LLP

(57) ABSTRACT

A forming method for a vehicle body member may include a tube making process of forming a steel pipe by welding a steel plate coil; a non-circular tube making process of primary preforming the steel pipe formed in the tube making process so as to have a cross section of a predetermined shape; a bending process of bending and secondarily preforming the steel pipe preformed firstly in the non-circular tube making process; and a hot stamping process of heating the secondarily preformed steel pipe, inserting the heated steel pipe into a mold to form a desired shape, and then, quenching the heated steel pipe to form a vehicle body member, thereby easily forming a vehicle body member having high rigidity.

15 Claims, 4 Drawing Sheets

(51) Int. Cl.
   *B21D 15/02*   (2006.01)
   *B21D 22/02*   (2006.01)
   *B21D 7/00*    (2006.01)
   *B21D 35/00*   (2006.01)
   *B21D 47/01*   (2006.01)
   *B21D 53/88*   (2006.01)
   *B62D 25/04*   (2006.01)
   *B62D 25/06*   (2006.01)

(58) Field of Classification Search
   CPC ........ B21D 53/88; B21D 7/00; B21D 22/022; B62D 25/06; B62D 25/04; B22F 5/00; B21C 37/00
   See application file for complete search history.

(56) References Cited

U.S. PATENT DOCUMENTS

| | | | | |
|---|---|---|---|---|
| 2009/0250146 | A1* | 10/2009 | Ishitsuka et al. ........ | C21D 8/02 148/645 |
| 2012/0009435 | A1* | 1/2012 | Nakamura et al. ....... | B22F 5/00 428/603 |
| 2013/0280548 | A1* | 10/2013 | Nakamura et al. ....... | B23B 1/08 428/586 |
| 2015/0176101 | A1* | 6/2015 | Ishitsuka et al. ........ | C21D 9/50 |
| 2019/0210654 | A1* | 7/2019 | Son ........................ | B62D 25/06 |
| 2020/0147664 | A1* | 5/2020 | Mihailescu ............. | B21D 17/04 |
| 2020/0180703 | A1* | 6/2020 | Son etal. ................ | B62D 25/04 |
| 2020/0271247 | A1* | 8/2020 | Fujimoto et al. ......... | F16L 9/17 |

\* cited by examiner

METHOD FOR FORMING VEHICLE BODY MEMBER

CROSS-REFERENCE TO RELATED APPLICATION

This application claims the benefit of priority to Korean Patent Application No. 10-2019-0062651 filed on May 28, 2019 in the Korean Intellectual Property Office, the entire content of which is incorporated herein by reference.

TECHNICAL FIELD

The present disclosure relates to a vehicle body. More particularly, the present disclosure relates to a method for forming a vehicle body member that forms a roof side member constituting a roof of a vehicle among an upper vehicle body in a tube shape.

BACKGROUND

In general, the upper part of a vehicle body includes a roof forming the roof of the vehicle and at least one pillar which is disposed back and forth along the length direction of the vehicle while supporting the roof.

At least one pillar typically include a front pillar disposed forwardly along the length direction of the vehicle, a rear pillar disposed at the rear, and a center pillar disposed between the front filler and the rear filler.

The opening and closing doors are mounted on the front pillar and the center pillar to be rotatable.

Recently, a vehicle body structure with an upper vehicle body formed by the front and rear fillers without the center filler has been developed and applied to expand the passenger compartment and increase convenience for getting on and off.

However, in such a vehicle body structure, the structural rigidity of the upper vehicle body is inevitably weakened because the center pillar is not used, and various reinforcement structures have been proposed to supplement the weakness of the vehicle body structure, but it was necessary to reinforce the rigidity of the upper vehicle body more effectively with fewer parts without increasing the weight and cost.

Thus, the present applicant has filed "a vehicle body structure" as application numbers of 10-2018-0003192 and 10-2018-0158266, and in the two inventions, a roof side member, which constitutes the upper vehicle body, was made in the form of a tube to increase the stiffness of the upper vehicle body.

The present disclosure relates to a method for forming a roof side member of a tube shape which is applied to the two inventions.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a method for forming a vehicle that can be easily manufactured while increasing the stiffness by manufacturing particularly a roof side member among a vehicle body member through a new hot stamping method.

A forming method for a vehicle body member according to an exemplary embodiment of the present disclosure may include, a tube making process of forming a steel pipe by welding a steel plate coil; a non-circular tube making process of primarily preforming the steel pipe formed in the tube making process so as to have a cross section of a predetermined shape; a bending process of bending and secondarily preforming the steel pipe primarily preformed in the non-circular tube making process; and a hot stamping process of heating the secondarily preformed steel pipe in the bending process, inserting the heated steel pipe into a mold to form a desired shape, and then, quenching the heated steel pipe to form the vehicle body member. A post-treatment process post-treating the vehicle body member formed by the hot stamping process may be further included. The post-treatment process may include a shot blasting process that sprays abrasive on the steel pipe to remove scale or casting sand. The post-treatment process may further include a piercing process that makes fastening holes to the vehicle body member through a laser processor after the shot blasting process. The tube making process may include a coil slitting process that unfolds and cuts a spiral-wound coil at a certain, and then, winds in a coil shape again; an uncoiling process of unfolding the spiral-wound again; a levelling process of levelling the uncoiled coil; a roll forming process of roll-forming the levelled coil in a tube shape; a welding process of welding the roll-formed tube; a beads removing process of removing beads generated in the welding process; a cooling process of cooling the tube in which the beads are removed; a sizing and cutting process of sizing and cutting the tube cooled in the cooling process at a predetermined size; a correction and chamfering process of correcting through a calibrator and chamfering through a chamfering machine the tube cut in the cutting process; and an inspection and packing process of inspecting and packing the chamfered steel tube. An electrical resistance welding may be performed in the welding process. An air cooling may be performed in the cooling process. The non-circular tube making process may include a surface treatment process of immersing a bundle of the steel tube packed in the tube making process in a surface treatment tank for surface treatment; a first preforming process of drawing or multi-step roll forming the surface-treated steel tube into a shape having a predetermined cross-section; a correction and cutting process of correcting through a calibrator and cutting the first preformed steel tube at a predetermined size through a cutting machine; an inspection process of nondestructive inspecting the first cut preformed steel tube; and a chamfering process chamfering the steel tube after nondestructive inspection. The first preformed steel tube may have a polygonal closed cross-section. The nondestructive inspection may be performed through ECT (Eddy Current Test). The bending process may include a second preforming process of bending the first preformed steel tube to have various curvatures through a bending machine. The second preforming process may bend the first preformed steel tube so as to have various curvatures on a two-dimensional plane. Bending the steel tube bent to have various curvatures on a two-dimensional plane on a three-dimensional space to have various curvatures again may be further included. In the second preforming process, the first preformed steel tube may be divided into a plurality of sections and bent to have different curvatures for each section. The mold may include an upper die and a lower die; and the lower die may be provided with a forming groove which the second preformed steel tube is seated on and formed in. The lower die may be provided with a slanted surface for inducing the second preformed steel tube into the forming groove; and the upper die may be provided with a slanted surface corresponding to the slanted surface of the lower die.

In accordance with a forming method for a vehicle body member according to an exemplary embodiment of the present disclosure, among the vehicle body members constituting the vehicle body, a roof side member constituting a roof of a vehicle can be manufactured by a hot stamping method to be combined with other vehicle body members so that it is possible to increase the rigidity of the roof of the vehicle with decreasing the weight and the number of parts of the vehicle body.

Furthermore, the vehicle body member can be easily manufactured with high rigidity.

BRIEF DESCRIPTION OF THE DRAWINGS

These drawings are for reference purposes only and are not to be construed as limiting the technical idea of the present disclosure to the accompanying drawings.

DETAILED DESCRIPTION

Figure 1:
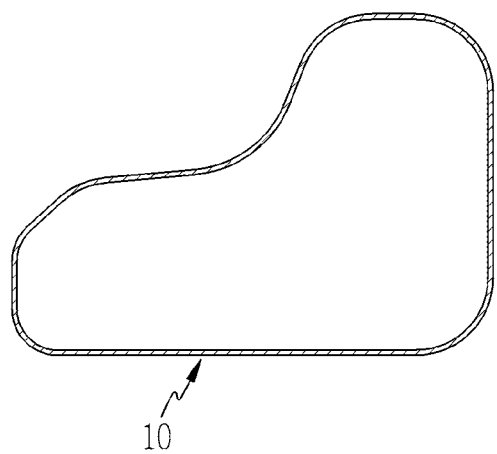
FIG. 1 is a cross-sectional view of a steel pipe preformed by a forming method for a vehicle body member according to an exemplary embodiment of the present disclosure.

The present disclosure will be described more fully hereinafter with reference to the accompanying drawings, in which exemplary embodiments of the invention are shown.

As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In the following description, dividing names of components into first, second and the like is to divide the names because the names of the components are the same as each other and an order thereof is not particularly limited.

Throughout the specification, unless explicitly described to the contrary, the word "comprise" and variations such as "comprises" or "comprising", will be understood to imply the inclusion of stated elements but not the exclusion of any other elements.

A method for forming a vehicle body member according to an exemplary embodiment of the present disclosure may include a tube making process, a non-circular tube making process, a bending process, a hot stamping process and a post-treatment process.

The tube making process is intended to manufacture a steel pipe with welding robustness by applying a thin-walled tube buckling control roll forming technique and a high-strength steel welding heat input quantity controlling technology. First, a coil slitting work that unfolds and cuts a spiral-wound coil at a certain width may be performed, and then winds it in a coil shape again.

Subsequently, a levelling work that unfolds the spiral-wound coil again and passes a levelling machine to make flat steel plates may be performed.

Continuously, the flat steel plates may be formed to steel pipes through a roll forming machine, and then welded in a welding machine through electrical resistance welding (ERW). At the same time, the welding beads may be removed through an eliminator.

In the tube making process, preferably, the thin pipe of high strength of 60K grade and 2.0 t thickness may be formed to steel pipes through roll forming control in a stable butt state before welding.

Further, when welding high carbon steel of 0.25 C or more, the quenching organization generation mechanism control and the heat input control may be performed so as to form homogeneous organization.

Next, after removing welding beads, the steel pipe may cooled through appropriate heat treatment such as air cooling, and then sized through a sizing machine and cut through a cutting machine at a predetermined size.

Continuously, the correction through the calibrator and the chamfering through the chamfering machine of the steel pipe may be performed to improve the precision of the steel pipe. For example, after the nondestructive inspection through the inspection machine may be performed and then, steel pipes 10 may be packed into the appropriate unit.

The steel pipe 10 manufactured in the tube making process as described above may be formed to have an appropriate cross-sectional shape through the non-circular tube making process. The non-circular tube making process may aim to prevent welding part cracks of the steel pipe 10 made in tube making process and to design optimal non-circular cross-section that can minimize thickness deviation after processing and form a drawing tube. At first, after the packed steel pipe 10 bundles may be immersed in a surface treatment tank in order for surface treatment, the surface-treated steel pipe 10 may be drawn into a steel tube with a predetermined cross-sectional shape in a drawing machine.

Of course, the surface-treated steel pipe 10 may be formed into a cross-section by a multi-step roll forming method.

The cross-section of the steel pipe formed by drawing or multi-step roll forming, as shown in FIG. 1, may have a polygonal closed cross-section.

The polygonal closed cross-section may be a cross-section of a roof side member, and also, may be formed into other polygonal cross-section when forming other members of the vehicle body.

Next, the steel tube may be calibrated to a predetermined size through a calibrator, cut to the predetermined size with a cutter, and then, subjected to the nondestructive inspection through an ECT (Eddy Current Test) and chamfered through the chamfering machine.

Next, in the bending process, the steel tube formed with a predetermined cross-section may be bent to have a various curvature through a CNC machine.

Figure 2:
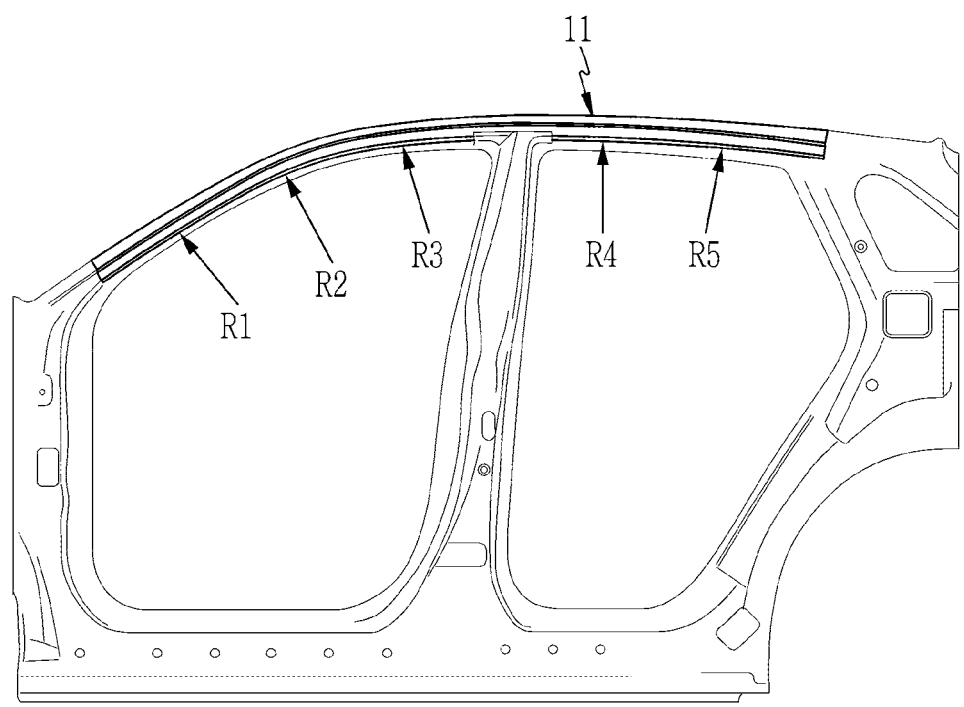
FIG. 2 and FIG. 3 are explanatory views for bending molding a vehicle body member (a roof side member) into a multi-stage curvature.

For example, as shown in FIG. 2, when forming a roof side member 11, dividing a roof side member 11 into a plurality of sections based on the side profile of the finished vehicle and subdividing the curvature R1, R2, R3, R4, R5, . . . in each section and preforming the steel tube by performing a two-dimensional CNC bending process.

Figure 3:
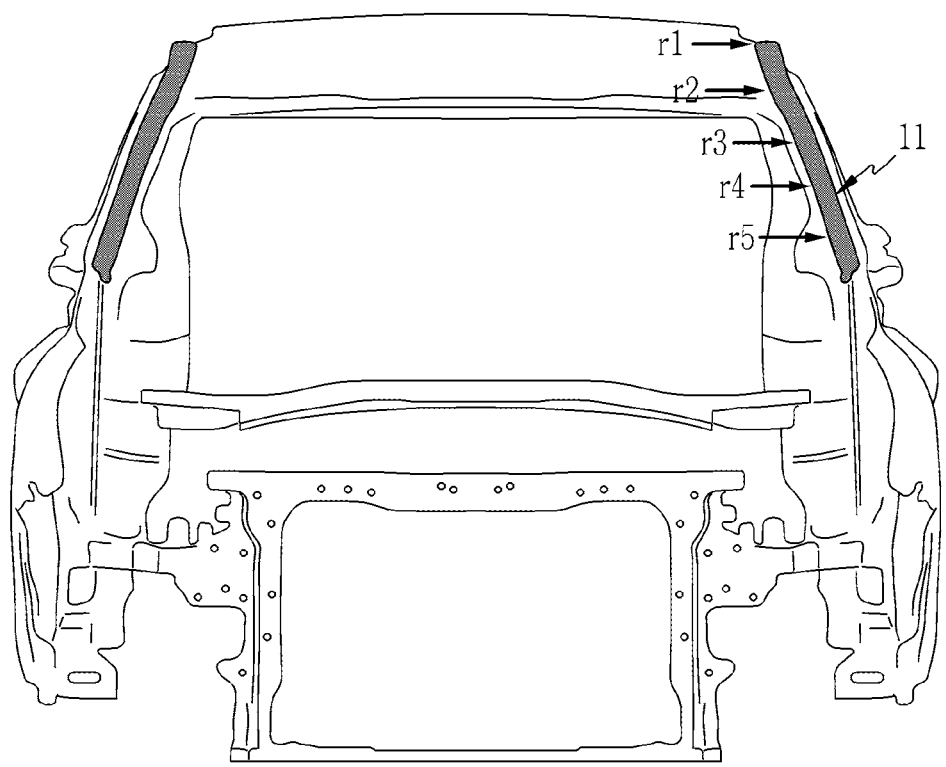

Continuously, as shown in FIG. 3, dividing the steel tube into a plurality of sections based on the front profile of the finished vehicle and subdividing the curvature r1, r2, r3, r4, r5, . . . in each section and preforming the steel tube by performing a three-dimensional CNC bending process.

Next, in the hot stamping process, the steel tube preformed to have the required cross-section and curvatures in the non-circular tube making process and bending process may be heated and quenched to have a final layout.

In the hot stamping process, the preformed steel tube may be heated and then, formed by a mold in order to have a final design size. Continuously, coolant may be directly injected to the heated steel tube to increase the rigidity of the steel tube.

Figure 4:
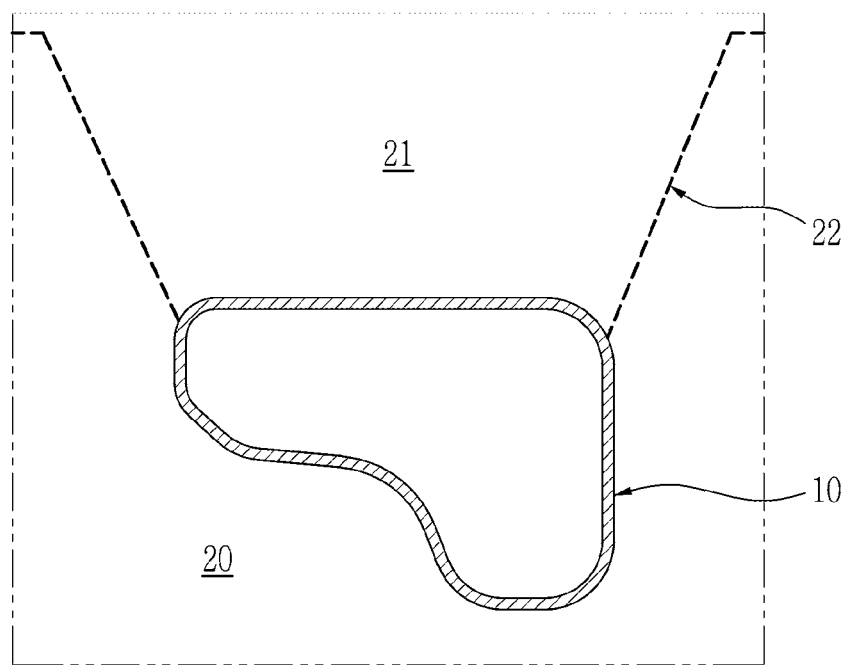
FIG. 4 is a schematic cross-sectional view of a mold used to a method for forming a vehicle body member according to an exemplary embodiment of the present disclosure.

When heating and seating the preformed steel tube on the mold, since the preformed steel tube has a three-dimensional shape with a plurality of curvatures in the preceding bending process, it is not ease to seat it on the mold. Thus, in the present disclosure, as shown in FIG. 4, a slanted surface 22 may be provided at a lower die 20 and an upper die 21 of the mold, respectively, so that the preformed and heated steel tube with three-dimensional multi-step curvatures can be easily seated in the lower die 20.

That is, the preformed and heated steel tube with three-dimensional multi-step curvatures may move down along the slanted surface 22 of the lower die 20 and may be easily inserted into and seated on a final forming groove formed at the lower die.

After the preformed and heated steel tube with three-dimensional multi-step curvatures is seated on the lower die 20, the upper die 22 with the same slanted surface 21 may be coupled with the lower die 20 to pressurize the steel tube, so that the steel tube may be formed to have a final design size.

Finally, in the post-treatment process, the abrasive may be sprayed on the steel tube separated from the mold so that the scale or casting sand may be removed (shot blasting). Also, fastening holes may be formed at the steel tube through a laser processor to complete a vehicle body member.

On the other hand, although an exemplary embodiment of the present disclosure describes the molding of a roof side member as an example, it can be applied to other vehicle body members as well.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for forming a vehicle body member, comprising:
   a tube making process of forming a steel pipe by welding a steel plate coil;
   a non-circular tube making process of primarily preforming the steel pipe formed in the tube making process so as to have a cross section of a predetermined shape;
   a bending process of bending and secondarily preforming the steel pipe primarily preformed in the non-circular tube making process; and
   a hot stamping process of heating the secondarily preformed steel pipe in the bending process, inserting the heated steel pipe into a mold to form a desired shape, and then, quenching the heated steel pipe to form the vehicle body member,
   wherein the tube making process includes:
   a coil slitting process of unfolding and cutting a spiral-wound coil at a certain width, and then, winding in a coil shape again;
   an uncoiling process of unfolding the spiral-wound again;
   a levelling process of levelling the uncoiled coil;
   a roll forming process of roll-forming the levelled coil in a tube shape;
   a welding process of welding the roll-formed tube;
   a beads removing process of removing beads generated in the welding process;
   a cooling process of cooling the tube in which the beads are removed;
   a sizing and cutting process of sizing and cutting the tube cooled in the cooling process at a predetermined size;
   a correction and chamfering process of correcting through a calibrator and chamfering through a chamfering machine the tube cut in the sizing and cutting process; and
   an inspection and packing process of inspecting and packing the chamfered steel tube.

2. The method for forming the vehicle body member of claim 1, further comprising a post-treatment process of post-treating the vehicle body member formed by the hot stamping process.

3. The method for forming the vehicle body member of claim 2, wherein the post-treatment process includes a shot blasting process of spraying an abrasive on the steel pipe to remove scale or casting sand.

4. The method for forming the vehicle body member of claim 3, wherein the post-treatment process includes a piercing process of making fastening holes to the vehicle body member through a laser processor after the shot blasting process.

5. The method for forming the vehicle body member of claim 1, wherein an electrical resistance welding is performed in the welding process.

6. The method for forming the vehicle body member of claim 1, wherein an air cooling is performed in the cooling process.

7. The method for forming the vehicle body member of claim 1, wherein the non-circular tube making process comprises:
   a surface treatment process of immersing a bundle of the steel tube packed in the tube making process in a surface treatment tank for surface treatment;
   a first preforming process of drawing or multi-step roll forming the surface-treated steel tube into a shape having a predetermined cross-section;
   a correction and cutting process of correcting through a calibrator and cutting the primarily preformed steel tube at a predetermined size through a cutting machine;
   an inspection process of nondestructive inspecting the cut preformed steel tube; and
   a chamfering process chamfering the steel tube after a nondestructive inspection.

8. The method for forming the vehicle body member of claim 7, wherein the primarily preformed steel tube has a polygonal closed cross-section.

9. The method for forming the vehicle body member of claim 7, wherein the nondestructive inspection is performed through ECT (Eddy Current Test).

10. The method for forming the vehicle body member of claim 7, wherein the bending process comprises a second preforming process of bending the primarily preformed steel tube to have various curvatures through a bending machine.

11. The method for forming the vehicle body member of claim 10, wherein the second preforming process includes bending the primarily preformed steel tube so as to have various curvatures on a two-dimensional plane.

12. The method for forming the vehicle body member of claim 11, further comprising bending the steel tube bent to have various curvatures on a two-dimensional plane on a three-dimensional space to have various curvatures again.

13. The method for forming the vehicle body member of claim 10, wherein, in the second preforming process, the primarily preformed steel tube is divided into a plurality of sections and bent to have different curvatures for each section.

14. The method for forming the vehicle body member of claim 12, wherein:
   the mold comprises an upper die and a lower die, and
   the lower die includes a forming groove which the secondarily preformed steel tube is seated on and formed in.

15. The method for forming the vehicle body member of claim 14, wherein:
   the lower die includes a slanted surface for inducing the second preformed steel tube into the forming groove, and
   the upper die includes a slanted surface corresponding to the slanted surface of the lower die.

* * * * *